US008914494B2

(12) United States Patent
Bunch

(10) Patent No.: US 8,914,494 B2
(45) Date of Patent: Dec. 16, 2014

(54) SYSTEM AND METHOD FOR USER BEHAVIORAL MANAGEMENT IN A COMPUTING ENVIRONMENT

(76) Inventor: Clinton D. Bunch, Sunnyvale, TX (US)

( * ) Notice: Subject to any disclaimer, the term of this patent is extended or adjusted under 35 U.S.C. 154(b) by 553 days.

(21) Appl. No.: 12/363,711

(22) Filed: Jan. 30, 2009

(65) Prior Publication Data

US 2009/0144421 A1 Jun. 4, 2009

Related U.S. Application Data

(63) Continuation-in-part of application No. 11/020,814, filed on Dec. 22, 2004, now abandoned, which is a continuation-in-part of application No. 10/870,469, filed on Jun. 17, 2004, which is a continuation of application No. 09/605,124, filed on Jun. 28, 2000, now Pat. No. 6,795,856.

(60) Provisional application No. 61/024,626, filed on Jan. 30, 2008.

(51) Int. Cl.
*G06F 15/16* (2006.01)
*H04L 12/26* (2006.01)
*H04L 29/08* (2006.01)

(52) U.S. Cl.
CPC .......... *H04L 43/045* (2013.01); *H04L 43/0876* (2013.01); *H04L 67/22* (2013.01); *H04L 67/306* (2013.01); *G06F 2221/2101* (2013.01)
USPC .......................................... 709/224; 709/229

(58) Field of Classification Search
USPC .................................................. 709/224, 229
See application file for complete search history.

(56) References Cited

U.S. PATENT DOCUMENTS

| | | | |
|---|---|---|---|
| 4,672,572 A | 6/1987 | Alsberg | |
| 5,802,304 A | 9/1998 | Stone | |
| 5,961,598 A | 10/1999 | Sime | |
| 5,983,270 A | 11/1999 | Abraham et al. | |
| 5,987,611 A * | 11/1999 | Freund | 726/4 |
| 5,991,807 A | 11/1999 | Schmidt et al. | |
| 6,018,619 A | 1/2000 | Allard et al. | |
| 6,026,440 A | 2/2000 | Shrader et al. | |
| 6,035,404 A * | 3/2000 | Zhao | 726/6 |
| 6,070,190 A | 5/2000 | Reps et al. | |
| 6,195,697 B1 | 2/2001 | Bowman-Amuah | |
| 6,397,336 B2 | 5/2002 | Leppek | |
| 6,526,341 B1 | 2/2003 | Bird et al. | |
| 6,622,116 B2 | 9/2003 | Skinner et al. | |
| 6,744,863 B2 | 6/2004 | Ferrier | |
| 6,795,856 B1 | 9/2004 | Bunch | |
| 7,269,824 B2 * | 9/2007 | Noy et al. | 717/127 |
| 7,401,142 B2 * | 7/2008 | Childress et al. | 709/224 |
| 8,219,430 B1 * | 7/2012 | Thompson et al. | 705/7.12 |
| 2004/0249938 A1 | 12/2004 | Bunch | |
| 2005/0114502 A1 * | 5/2005 | Raden et al. | 709/224 |

\* cited by examiner

*Primary Examiner* — Douglas Blair
(74) *Attorney, Agent, or Firm* — Scott T. Griggs; Griggs Bergen LLP

(57) ABSTRACT

A system and method for user behavioral management in a computing environment are disclosed. In one embodiment, the system includes a computer having computing resources including, for example, a plurality of applications installed thereon. A monitoring module is associated with the computer in order to monitor a plurality of utilization parametrics to determine the utilization of the computing resources by a user and provide to the user a substantially realtime, visible indication of the utilization of the computing resources. The data captured relative to the utilization parametrics enables, at the management level, enterprise-wide administration of the computing resources and, at the user level, self-directed behavioral modification with respect to computing resource management.

11 Claims, 7 Drawing Sheets

SYSTEM AND METHOD FOR USER BEHAVIORAL MANAGEMENT IN A COMPUTING ENVIRONMENT

CLAIM OF PRIORITY & CROSS REFERENCE TO RELATED APPLICATIONS

This application claims priority from Application Ser. No. 61/024,626, entitled "System and Method for Reporting User Activities" and filed on Jan. 30, 2008; and this application is a continuation-in-part of application Ser. No. 11/020,814, entitled "System and Method for Monitoring Application Utilization" and filed on Dec. 22, 2004 now abandoned; which is a continuation-in-part of application Ser. No. 10/870,469, entitled "System and Method for Monitoring Access to a Network by a Computer" and filed on Jun. 17, 2004 in the names of Clinton D. Bunch and Daniel C. Zimmerman; which is a continuation of application Ser. No. 09/605,124, now U.S. Pat. No. 6,795,856, entitled "System and Method for Monitoring the Internet Access of a Computer" and filed on Jun. 28, 2000 in the name of Clinton D. Bunch; all of which are hereby incorporated by reference for all purposes.

TECHNICAL FIELD OF THE INVENTION

This invention relates, in general to applications and software programs and, in particular, to a system and method that provide for user behavioral management in a computing environment to enable behavioral modification with respect to computing resource management.

BACKGROUND OF THE INVENTION

Businesses rely on information technology (IT), including applications, software programs, hardware, and bandwidth, for example, to provide the infrastructure required to support performance and productivity. As IT has become more integrated into business operations and the dependency on IT has increased, productivity tools have been developed and deployed to evaluate and report user interactions with IT. The reporting options furnished by existing productivity tools, however, have failed to fully meet industry needs by providing reports that are "one off" or one step removed from the administrator's needs as a result of not fully being customizable while maintaining a minimum production and build time. Moreover, existing productivity tools make user behavior modification laborious for administrators and managers.

SUMMARY OF THE INVENTION

A system and method are disclosed that provide for user behavioral management in a computing environment in order to address the aforementioned limitations of existing productivity tools. In one embodiment, the system includes a computer having computing resources including, for example, a plurality of applications installed thereon. A monitoring module is associated with the computer in order to monitor a plurality of utilization parametrics to determine the utilization of the computing resources by a user and provide to the user a visible indication of the utilization of the computing resources at any desired frequency including in substantially realtime or daily, for example. The data captured relative to the utilization parametrics enables, at the management level, enterprise-wide administration of the computing resources and, at the user level, self-directed behavioral modification with respect to computing resource management.

The systems and methods presented herein not only provide for the enablement of self-directed behavioral modification but employer-directed behavioral modification as well. In one embodiment, all applications and computing resources used by a user may be observed. Management or an administrator may have the client module running invisibly to establish a baseline and provide reporting including enterprise activity reporting, department comparisons (e.g., IT, H/R, Financing, etc.), website usage, time of day usage, and application usage, for example. Management may assign individuals to different groups within a hierarchy such as enterprise, department, group, individual and individual managers may manage their own team members by assigning minimum and/or maximum targets for applications and computing resources. The reports generated by the system allow management to address a problem through limits, discussion, or user self-directed behavior management through the indicator tool. Also, management may encourage behavior trough setting targets, discussion, and self-directed behavior management. This visibility has additional benefits including analyzing the manner in which new applications are being deployed and extending across Internet and non-Internet computing resources.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
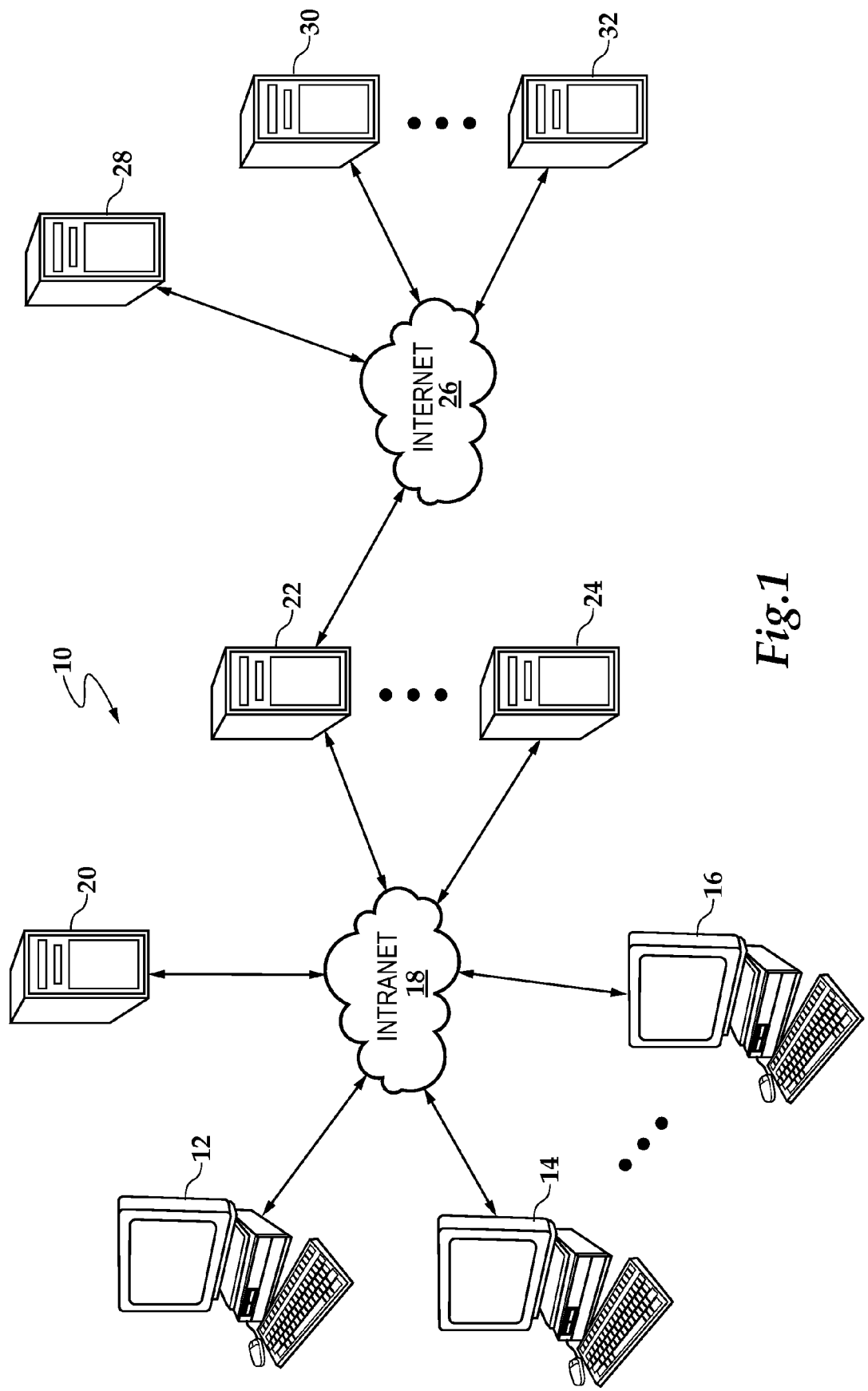
FIG. 1 is a schematic diagram providing an overview of a network-based IT infrastructure wherein one embodiment of a system for monitoring application utilization is being implemented.

Referring initially to FIG. 1, therein is depicted a network-based IT infrastructure 10 wherein one embodiment of a system for user behavioral management is being implemented. In the illustrated computing environment, computers 12, 14, and 16 are connected to each other via an intranet 18. Each of the computers 12, 14, and 16 may comprise any combination of hardware, software, and firmware that accepts structured input, processes the input and produces the results of the processing as output. In one embodiment, computers 12, 14, and 16 are personal computers that are designated for a single user or small group of users. In another embodiment, the computers 12, 14, and 16 may comprise personal computers, cellular telephones, personal digital assistants (PDAs), kiosks, televisions, electronic game consoles, MP3 players, or other electronic devices. Particularly, handheld computers, palmtop computers, mobile phones, smartphones and other types of PDAs are contemplated. In other embodiments, computer includes televisions and monitors as well as various text messaging, tweeter interfacing, and IM devices.

Additionally, each of the computers 12, 14, and 16 may include any number of peripheral devices such as monitors or keyboards, for example. A router or other device may provide the routing and switching interface for the intranet 18. Each of the computers 12, 14, and 16 may be connected to the intranet 18 by a physical connection, such as a Category 5 (CAT5) cable, or a wireless connection. For example, the wireless connection may be based on an Institute of Electrical and Electronics Engineers (IEEE) 802-based standard such as 802.11, 802.11a, 802.11b (Wi-Fi), or 802.1G, for example.

Servers 20, 22, and 24 are also connected to intranet 18 such that, in one embodiment, computers 12, 14, and 16 and servers 20, 22, and 24 may communicate within a local area network (LAN) provided by the computing environment. The servers 20, 22, and 24 may have a structure and functionality that is similar to the aforementioned computers 12, 14, and 16. In one implementation, the servers 20, 22, and 24 provide services to the computers 12, 14, and 16 via the intranet 18. The servers 20, 22, and 24 may store and administer software applications, data, security measures, or provide access to peripherals or external systems, for example. As illustrated, the server 22 includes a module that provides mail service and access to the Internet 26 for the computers 12, 14, and 16 and the servers 20 and 24. The Internet 26 includes a distributed network of many computers, illustrated as servers 28, 30, and 32, linked together by way of numerous communications providers.

With respect to the computer 12, in operation, an application is installed thereon. A monitoring module having guidelines, which govern the utilization of applications and management of computing resources, is also associated with the computer 12. By way of example, the guidelines may prescribe a limit of three hours of Internet browsing with an Internet browser per week. The monitoring module monitors a utilization parametric that is indicative of a user utilizing or interacting with the application or managing an element of the computing resources. The status of the Internet browser, i.e., inactive or active, may be monitored to determine the time a user consumes on the Internet. By way of another example, the guidelines may prescribe a limit of 5 MB of bandwidth for streaming audio and video content per day. The bandwidth of the content associated with a streaming media application may be monitored to determine the bandwidth a user consumes with respect to streaming content.

The monitoring module may provide visibility into application utilization to a user and/or to an administrator. In one embodiment, the monitoring module may provide an indication or visual indicator to the user of the utilization of the application. The indication may take the form of a timer or meter or indicator on the desktop that displays the amount of time consumed or time remaining. Accordingly, in this embodiment, the monitoring module provides the user visibility into the application utilization.

In another embodiment, the monitoring module may provide a substantially realtime, visible indication to the user of the utilization of the application. Additionally, in an in-house embodiment, the monitoring module may transfer data relative to the utilization parametric over the intranet 18 to the server 20 which has a processing module installed thereon. The processing module generates, based upon the utilization parametric, a report relative to the utilization of the application or management of computing resources, or one or more computing elements thereof. As will be explained in further detail hereinbelow, the report may be a user profile report, a resource evaluation report, or a productivity evaluation report, for example. Accordingly, in this embodiment, the monitoring module provides the user and administrators visibility into the utilization of the application as well as a baseline profile of the user management of computing resources.

In a further embodiment, the monitoring module operates in a stealth mode or benchmark establishing mode wherein no indication is provided to the user regarding the utilization of the application. In this embodiment, the monitoring module, however, does transfer data relative to the utilization parametric over the intranet 18 to the server 20 which has a processing module which may generate one of the aforementioned reports. Hence, in this embodiment, the monitoring module provides administrators visibility into the utilization of the application and computing resource management at an enterprise, department, group, or individual user level, for example. After the stealth mode is utilized to establish baseline behavior, the aforementioned guidelines and visual indicator furnish a tool for self-directed behavior management with respect to the use of computing resources during a transparent mode of operation. Monitoring and reporting may continue in this transparent mode of operation to measure the success of the user self-directed behavioral management with the visual indicator tool. It should be appreciated that although the processing module has been described as being installed on the server 20, the processing module may be installed on any computer. For example, in a stand alone embodiment or a single computer environment, the processing module may be installed on computer 16. By way of another example, in an application service provider (ASP) embodiment, the processing module is installed on a remote server, such as server 28, that is accessible via the Internet 26. More generally, the systems and methods presented herein furnish an employer with an understanding of behavior at various levels, for example, enterprise, department, group, or user. This understanding empowers the employer to discuss, institute limits or provide tools for self-directed behavior modification.

Further, it should be appreciated that although an office environment having a particular architecture is depicted in FIG. 1, the system and method for monitoring application utilization may be utilized in any environment having any architecture. For example, the system and method presented herein may be utilized in a home wherein the monitoring module is installed on a home computer that is in communication with a processing module installed on a remote server that is accessible via the Internet.

Figure 2:
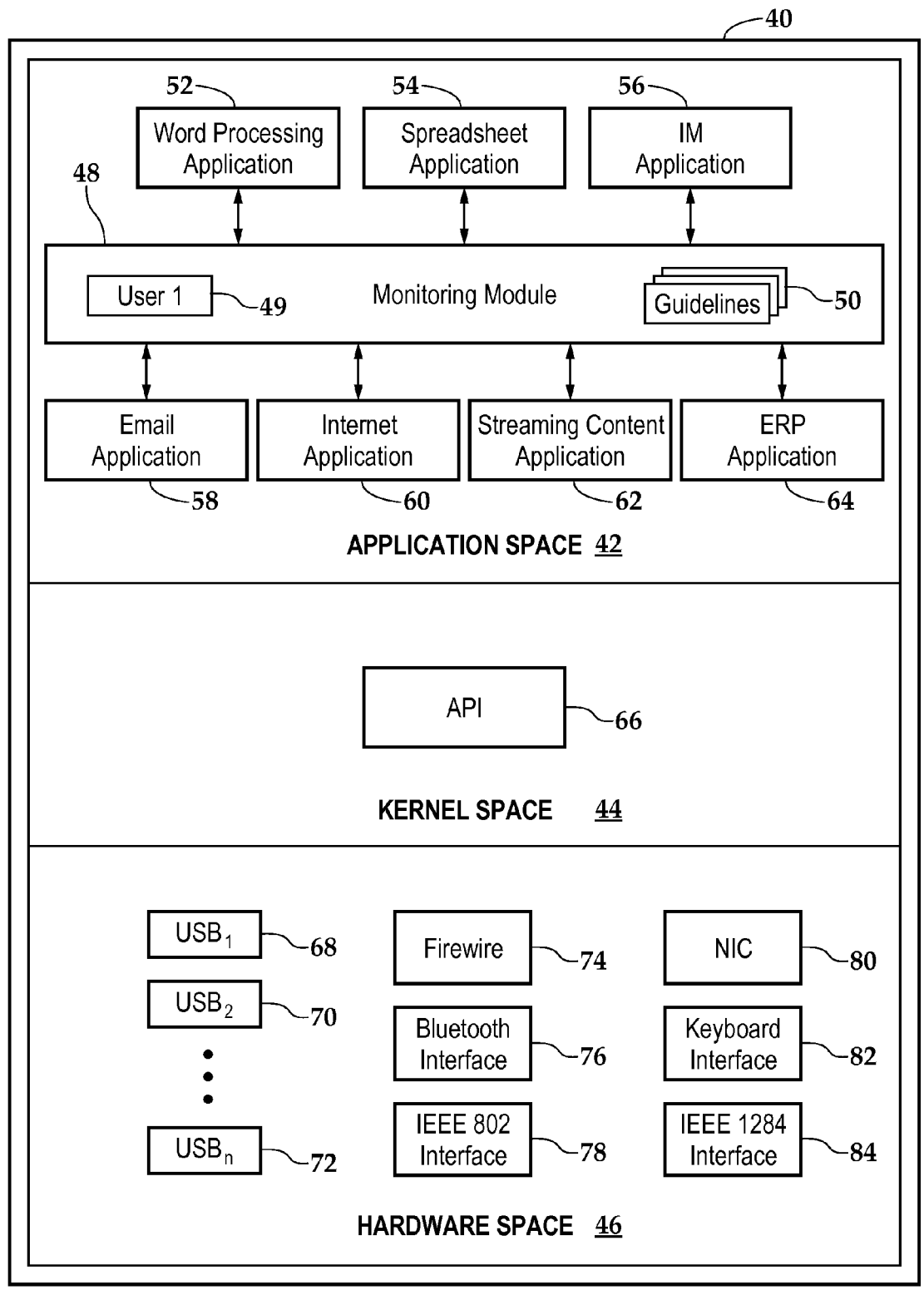
FIG. 2 is a functional block diagram of one embodiment of a computerized device having a monitoring module.

FIG. 2 depicts a functional block diagram of one embodiment of a platform 40, which may be any type of computerized device. The platform 40 includes an application space 42, a kernel space 44, and a hardware space 46. The application space 42 includes a monitoring module 48 having a history log 49 and guidelines 50. Additionally, the application space 42 includes application programs that carry out various useful tasks by accessing the underlying services provided by the kernel space 44. By way of example, the illustrated applications include a word processing application 52, a spreadsheet application 54, an instant messaging (IM) application 56, an email application 58, an Internet application 60, a streaming content application 62, and an enterprise resource planning (ERP) application 64. The illustrated applications, which are examples of computing resources, may include Internet-dependent as well as non-Internet applications. The aforementioned email application 58 being an example of an Internet-dependent computing resource and a word processing program being an example of an non-Internet application.

As previously alluded to, the monitoring module monitors utilization parametrics that are indicative of the user's utilization of applications and/or management of computing resources. The utilization parametrics are stored in the history log 49 and the guidelines 50, which may vary between applications, indicate which utilization parametrics and applications are to be monitored. For example, with respect to the Internet application 58 and browsing the world wide web, the guidelines 50 may indicate that the monitoring module 48 monitor parametrics relative to the (i) the number of permitted minutes/week, (ii) the number of minutes already consumed this week, (iii) the monitored and restricted start and end times (i.e., unrestricted Internet access may be permitted during certain periods of the day), (iv) the website destinations of the application, (v) the consumed time, (vi) the remaining time, (vii) the consumed bandwidth, and (viii) the remaining bandwidth. Collectively, the consumed bandwidth and the remaining bandwidth may be referred to as the amount of authorized bandwidth. The guidelines 50 may further indicate that if the user exceeds the permitted time during the monitored period, the monitoring module 48 may notify the user and request that the user terminate the Internet application 60. If the user fails to terminate the Internet application 60, then a violation notification may be sent to the processing module. In one implementation, certain time periods (by way of further examples: individuals with respect to IM applications, websites with respect to browsers) are considered un-metered and are monitored by the monitoring module 48, but not charged against the user's permitted Internet time.

By way of another example, the guidelines 50 may indicate that the IM application 56 should be monitored with respect to (i) the number of IM sessions permitted each day, week, month, etc. (ii) the number of IMs sent and received each week, (iii) the amount of time spent using the IM application 56, (iv) the individuals contacted by the IM application 56, and (v) the number of individuals contacted by the IM application 56. The guidelines 50 may indicate that if the user violates any of the guidelines, then monitoring module 48 notifies the user. Further, if the user fails to terminate the violating activities, then the monitoring module 48 may notify the processing module which, in turn, may notify a supervisor and/or another designated individual.

By way of further example, the guidelines 50 may indicate that the word processing application 52 requires monitoring with respect to utilization parametrics including (i) the number of keystrokes, (ii) the number of pages created, (iii) the number of documents created, (iv) the amount of time spent interacting with the word processing application 52, and (v) the amount of time remaining to interact with the word processing application 52. The utilization parametrics for the amount of time spent and the amount of time remaining may collectively be refereed to as the amount of authorized time. In one embodiment, regardless of whether or not the user violates the guidelines, the monitoring module does not block the user's request. In this respect, the systems and methods presented herein do not act as filter. Rather, as will be described in more detail hereinbelow, the systems and methods presented herein rely on the indications provided to the user by the meters and reports generated to create accountability that positively impacts behavior and results in increased human performance. By way of another example, the guidelines 50 may indicate that voice-related or speech recognition applications or devices require monitoring with respect to utilization parametrics including (i) words per minute, (ii) amount of speech time, or (iii) the amount of time listening, for example.

The kernel space 44 provides the layer of an operating system that contains the system-level commands, such as device drivers, memory management routines and system calls, hidden from the application space 42 that are utilized to control the hardware space 46. An application programming interface (API) 66 provides the set of standard interrupts, calls, and data formats, collectively commonly referred to as "hooks," that the applications 52-64 use to initiate contact with the underlying kernel space 44 and hardware space 46. The Internet application 60, the IM application 56, and the word processing application 52 as well as the other applications discussed in FIG. 2 permit many of their function calls to the API 66 to be monitored by the monitoring module 48. More particularly, the monitoring module 48 monitors the function calls that are related to the utilization parametrics to determine how each application 52-64 is being utilized.

The hardware space 46 includes the actual physical computing machinery. For example, if platform 40 is a computer or notebook computer, the physical computing machinery may include components such as a liquid crystal display (LCD) panels, video adapters, integrated drive electronics (IDEs), CD-ROMs, and hard disk controllers, for example. As depicted, the hardware space 46 includes universal serial bus (USB) interfaces 68, 70, and 72 which allow multiple peripheral devices in a daisy-chain or star topology to be attached through a single interface to the platform 40. An IEEE 1394 or Firewire interface 74 is also included to provide a digital interface for consumer video electronics, hard disk drives, and related electronics. A Bluetooth interface 76 permits standardized wireless transmission between a wide variety of devices including personal computers, cordless telephones, personal digital assistants (PDAs), televisions, electronic game consoles, and MP3 players.

A wireless interface 78, which may be based on of the aforementioned IEEE 802.11, 802.11a, 802.11b (Wi-Fi), or 802.1G interfaces, provides a standardized networking architecture for a variety of devices that are similar to those listed with respect to the Bluetooth interface 76. A network interface card (NIC) 80 provides a physical and logical connection to a network, such as an intranet or an Internet. A keyboard interface 82 provides for a connection to a keyboard. An IEEE 1284 interface 84 provides for a connection to a printer.

The monitoring module 48 monitors utilization parametrics associated with the applications 52-64 and the hardware interfaces 68-84 to determine the utilization of an application and/or management of computing resources. Additionally, the monitoring module 48 monitors utilization parametrics, such as keystrokes or websites, associated with the operating system which, in turn, is monitoring the hardware interfaces 68-84. By way of example, the monitoring module 48 monitors the Internet application 60 by monitoring the keystrokes entered into keyboard interface 82, the history folder or file generated by the Internet application 60, the bandwidth consumption associated with the NIC 80 and the amount of time the Internet application 60 is in an active state, e.g., the monitoring module 48 does not consider the Internet application 60 to be active when it is minimized. The monitoring of the IM application 56 is similar to the monitoring of the Internet application 60. The monitoring module 48 monitors the word processing application 52 by monitoring the keystrokes entered into keyboard interface 82, the number of pages generated by the word processing application 52, and the amount of time the word processing application 52 is in an active state.

The monitoring module 48 is equipped with additional features that prevent user abuse and ensure an accurate measurement of the time a user is utilizing an application. The monitoring module is operable to search the platform 40 for unauthorized files. For example, in the event that the user of the platform 40 attempts to circumvent the monitoring module 48 by installing unauthorized applications, the monitoring module 48 is operable to perform a periodic search of the files on the platform 40 to determine the presence of unauthorized file names and, in one embodiment, block the use of programs associated with these unauthorized file names. The monitoring module 48 may accomplish this by comparing a compiled list of file names associated with unauthorized applications to the applications installed in the application space 42. Additionally, the monitoring module can detect extended periods of application inactivity by analysis of the collected utilization parametrics. Responsive to the detected inactivity, the monitoring module may automatically minimize the application or temporarily halt the relevant utilization parametrics. By using either of these methodologies, user inactivity that may skew the visibility of the application utilization is ignored and not taken into consideration.

Accordingly, the monitoring module 48 tracks when the applications 52-64 are used and how each is being utilized in terms of utilization parametrics. The data collected by the monitoring module 48 relative to the utilization parametrics may be provided to the user and/or an administrator to yield insight into application utilization and management of computing resources at various levels including enterprise, department, group, and individual, for example. With respect to the user, based upon the guidelines 50 for utilizing the particular application, the monitoring module 48 provides the user a substantially realtime, visible indication of the utilization that is a tool for self-directed behavioral management. For example, a timer or meter may display to the user the remaining time with respect to non-Internet based applications like a company word processing program. By way of another example, the timer or meter may display a target time with respect to a non-Internet application such as a new company document retrieval system that each employee must use for a minimum of 30 minutes per week. In this case, the meter may count toward achieving a minimum usage rather than counting toward a maximum usage. Preferably, any of these indications are achieved by way of a meter that is visible on a display associated with the platform 40. It should be appreciated, however, that the indication may also be audio. With respect to the administrator, the data may be forwarded via the NIC 80 to a processing module associated with a server so that an administrator may have visibility into the user's utilization of the application by viewing web-based reports, for example.

Figure 3:
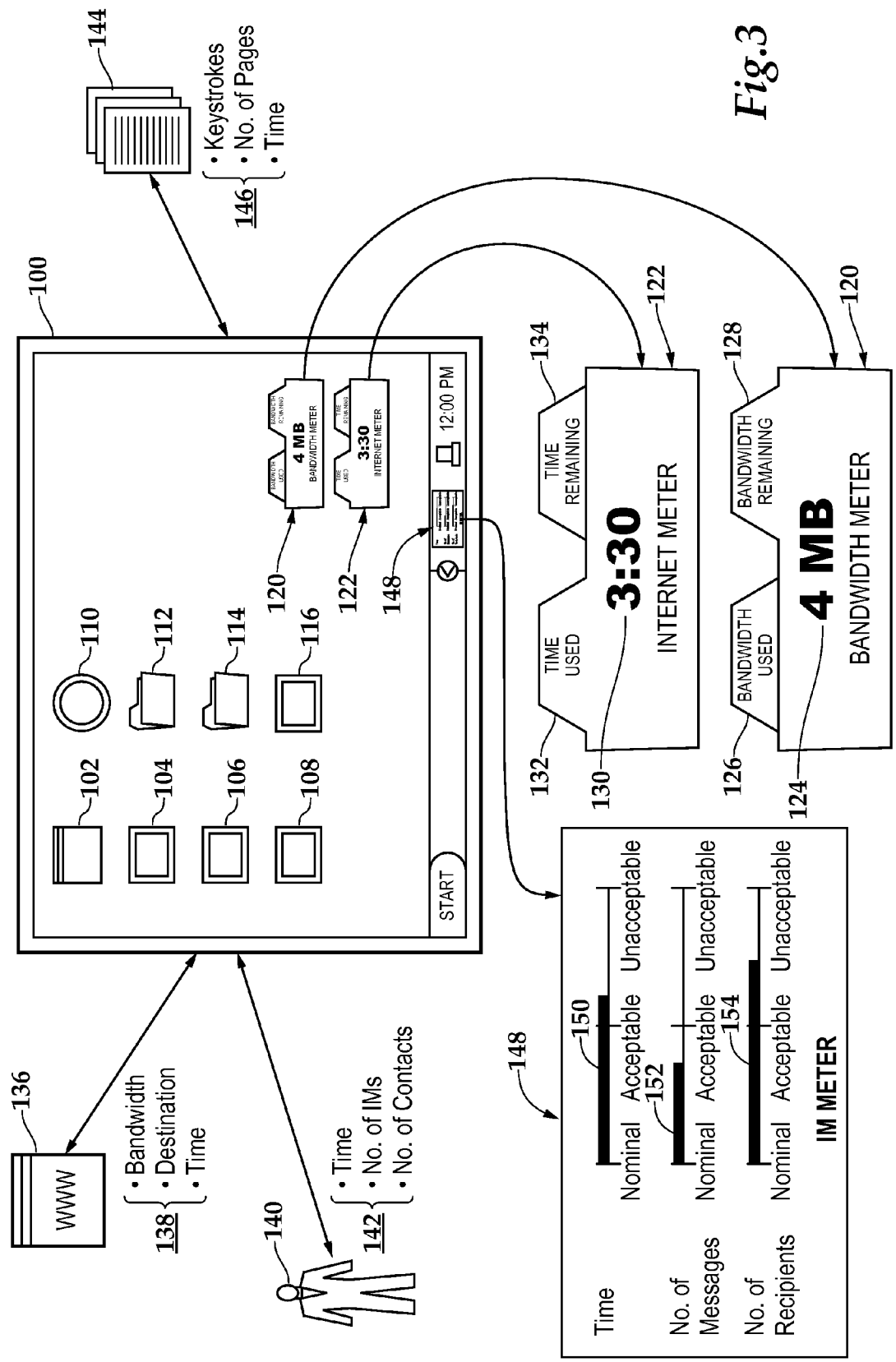
FIG. 3 is a schematic diagram of one operational embodiment of a computer having a monitoring module.

FIG. 3 depicts a schematic diagram of one operational embodiment of a display 100 of a computer platform having a monitoring module installed thereon. Icons 102 through 116 represent various applications running on the computer platform. The monitoring module provides a bandwidth meter 120 and an Internet meter 122 that are visible to the user on the display. In particular, the meters 120 and 122 provide an indication of application utilization to the user.

By way of example, the bandwidth meter 120 includes both a bandwidth used tab 126 and a bandwidth remaining tab 128 that provide the user with indications of the used and remaining bandwidth, respectively. As illustrated, the bandwidth remaining tab 128 is selected and, correspondingly, the bandwidth remaining 124, 4 MB, is shown. Similarly, the Internet meter 122 includes a time used tab 132 and a time remaining tab 134. The time used tab 132 is selected and the amount of time, 3 hours and 30 minutes, that the user has used accessing the Internet is displayed. The meters 120 and 122 may include other information as well. For example, meter 122 may include a listing by category (please see Table 1: Table 1: Categorization of Websites at paragraph 40 hereinbelow) of the most frequently visited websites.

The user is utilizing the Internet browser application 102 as indicated by the interactive www session icon 136. As discussed previously, the monitoring module monitors utilization parametrics 138 through the various applications or the hardware input interfaces such as keyboard inputs or mouse inputs, and the application state, for example. In particular, the bandwidth consumed, the destination or websites visited, and the time consumed are monitored. The monitoring module has the ability to monitor bandwidth usage by source application and by destination. An indication of the bandwidth consumed is provided to the user via meter 120. Each website that is visited is rated in accordance with a predefined list of categories, websites, and URLs as will be discussed in further detail hereinbelow. The time consumed is monitored and a corresponding indication of the time consumed is provided to the user by way of meter 122. In the illustrated embodiment, the data relative to the utilization parametrics 138 including the data relative to the bandwidth consumed, source information, destination information, and time consumed is forwarded to a processing module for further analysis.

The user is also utilizing an IM application 104 as indicated by the virtual contact session icon 140. The utilization of the IM application 104 is being monitored by way of utilization parametrics 140. More specifically, the amount of time consumed, the number of messages and the number of contacts communicated with are monitored by the monitoring module and then reported to the processing module for further analysis.

The word processing application 106 is also being utilized as represented by a word processing session icon 144. Utilization parametrics 146 which include keystrokes, number of pages produced, number of documents produced and amount of time consumed utilizing the word processing session 144 are monitored and data relative to the utilization parametrics 146 is transferred to the processing module. Although the meters 120 and 122 are depicted and described as only monitoring bandwidth and time consumed with respect to the Internet browser application 102, it should be appreciated that the meters 120 and 122 may provide any type of indication of application utilization to the user. By way of example, with respect to the IM application 104 and the IM session 140, a meter may display the amount of time spent using the IM application 104 or number of IMs sent during the IM session 140, for example. With respect to the word processing application 106 and the word processing session 144, a meter may display the average number of words per minute entered or the average number of pages generated per hour, for example. Moreover, a meter may notify a user of a violation of the guidelines by presenting a visual indication with an explanation or an audio signal, for example.

It should be appreciated that the meters may have varied forms. For example, an IM meter 148 is located in the tray or pan of the desk top environment. The IM meter 148 indicates the amount of time, the number of messages, and the number of recipients with meters 150-154, respectively, that express each of these utilization parametrics in terms of a continuum having "nominal", "acceptable", and "unacceptable" designations. It should be further appreciated that any other applications, such as applications 52-64 of FIG. 2, may have meters associated therewith for providing substantially real-time indications of application utilization to the user. Further, the meters may be pop-up meters or meters that express or summarize a utilization parametric by presenting a small icon in a corner of the desktop environment for a temporary period of time. Additionally, meters may be integrated together to create a dashboard that provides a quick and easily accessible overview of the user's utilization. In particular, the dashboard may combine the data of meters 120, 122, and 148 into a single meter. It should be appreciated that alone, or integrated as a dashboard, meters 120, 122, and 148 provide a visible indication to the user of the utilization parametrics. Moreover, this visible indication may be updated in substantially realtime.

Figure 4:
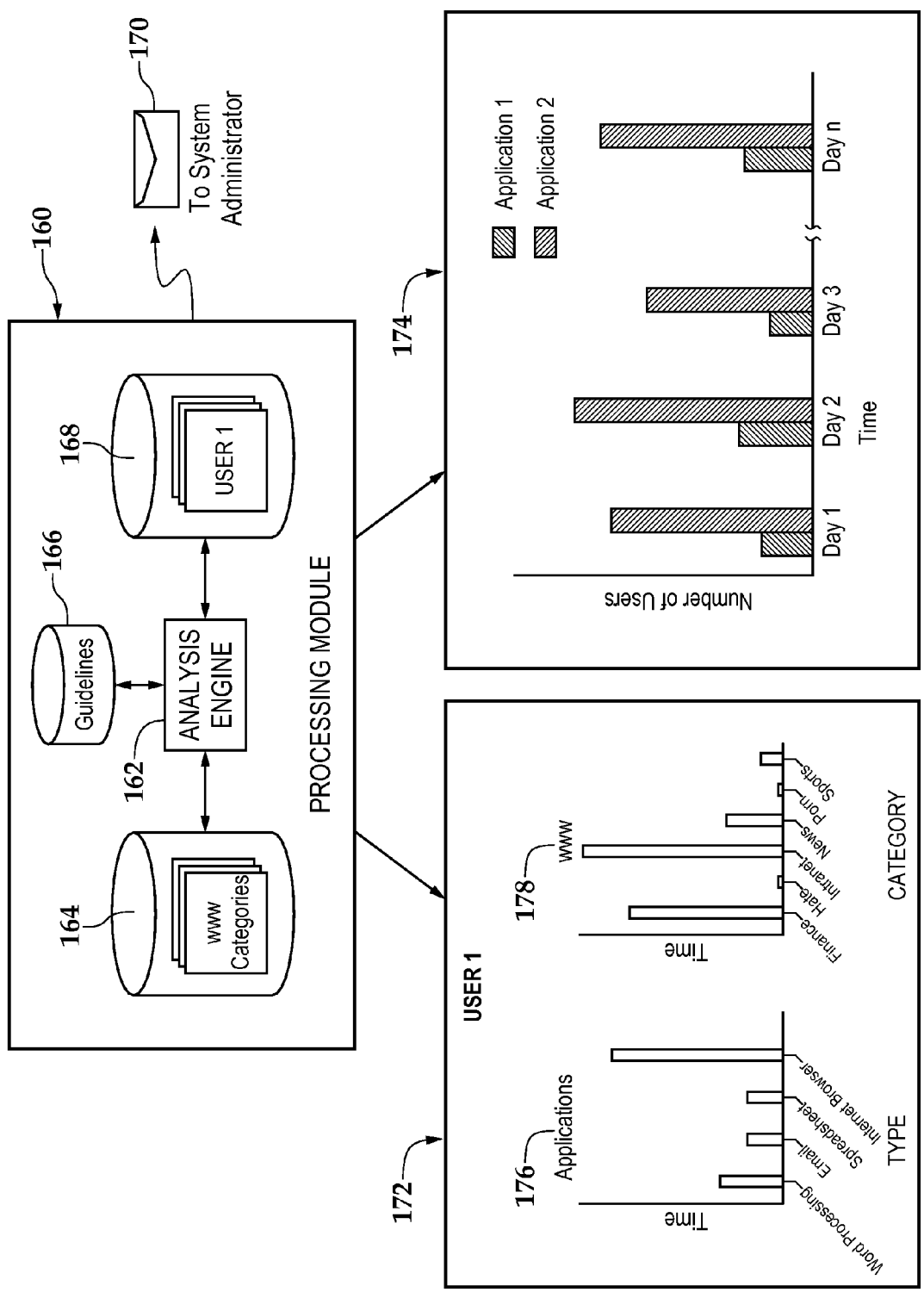
FIG. 4 is a schematic diagram of a processing module generating reports in accordance with the teachings presented herein.

FIG. 4 depicts a schematic diagram of one embodiment of a processing module 160 generating reports in accordance with the teachings presented herein. The processing module 160 includes an analysis engine 162, a database 164 having a categorization of websites, a database 166 having guidelines, and a database 168 having user data. The analysis engine 162, which is the main processing element of the processing module 160, performs several functions with respect to each of the databases 164, 166, and 168 as well as the monitoring modules.

The database 164 provides an accessible archive of websites and their corresponding rating. The database 164 may be created from proprietary data, third-party data, or a combination thereof. By way of example, the following table illustrates the data that may be contained in the database 164.

TABLE 1

Categorization of Websites

| WEBSITE | CATEGORY |
|---|---|
| bestbuy.com | consumer |
| bloomberg.com | financial |
| cnn.com | news |
| espn.com | sports |
| sonypictures.com | entertainment |

It should be appreciated that additional categories of websites or alternative classifications are possible as well. For example, additional categories may include "hate" websites and pornographic websites. Additionally, it should be appreciated that the actual database will much larger. Further, in one embodiment, the processing module 160 and the guidelines 166 are associated with different computer platforms and communicate via a LAN or the Internet.

The guidelines 166 provide the aforementioned user and group based policies regarding the utilization of applications. Additionally, as previously discussed, the guidelines may be uniform for a group of users or specifically tailored on a user-by-user basis. The analysis engine 162 provides an interface, such as command line interface or a graphical user interface (GUI), to an administrator to configure the guidelines. In one embodiment, the interface is a web-based interface that permits the administrator to configure the guidelines from a computer that is remote with respect to the processing module 160.

By way of further example, the accessible archive may include more than websites and their corresponding rating. The following table, Table 2, illustrates additional types of programs and categorization that may occur.

TABLE 2

Categorization of Applications

| Application | CATEGORY |
|---|---|
| Payroll Program | Business Application |
| Email Program | Email |
| Web Browser | Internet |
| IM Tool | Non-work |
| Spreadsheet Program | Office Application |

The database 168 provides an accessible archive of each user's utilization of the applications being monitored. Each monitoring module transfers the data, e.g., history log 49 of FIG. 2, relative to the utilization parametrics from the user's computer to the processing module 160 wherein the analysis engine 162 stores the data in database 168. The monitoring modules may stream the data in substantially real-time, transfer the data after a predetermined period of time has lapsed, or transfer the data in response to an event such as the end of a business day or a violation of the guidelines. Once the data is transferred, the analysis engine 162 may be utilized by an administrator to view the raw data or generate a report (examples of which are presented hereinbelow). Moreover, it should be appreciated that the reports can be accessed and generated by users that have the proper permissions and network connection to the processing module.

With respect to database 164 and database 168, the websites a user has visited may be stored in the database 168 and these websites may be rated as the data is loaded into the database 168 from the monitoring modules. In another embodiment, the websites that a user has visited may be rated after a predetermined period of time in order to ensure that the database 164 of categories has the most up to date data.

Additionally, the processing module 160 can generate a exception notification 170 via an email or a page, for example, to notify a manager or employee supervisor of a user violation of the guidelines. In another embodiment, the exception notification 170 may be a regular update that is periodically sent to the administrator.

The report 172 displays the productivity of user 1 in table 176 and the Internet browsing activities of user 1 in table 178. Utilizing reports, such as the report 172, ensures that administrators and other IT management have the information necessary in order to gauge the usage levels of various applications, the amount of time the business spends running non-essential applications, and the amount of time the business spends utilizing essential applications, such as Internet browsers, for personal reasons, for example.

Reports, such as the report 172, generated from analysis of user activities, enable administrators or supervisors to design a group or user-specific gateway page based on the group's or user's application utilization. The gateway page may be a customized application presentation, such as a customized Internet browser presentation, that optimizes the selection of applications 102 through 116 that are presented on the user's computer platform. In another implementation, the gateway page may include a customized initial website or homepage, e.g., a gateway page, having quick links to the most valuable resources for a particular group's or user's profile. By way of example, the gateway page will contain the most frequently used pages and suggest links based on the utilization parametrics as well as the utilization parametrics of similarly situated groups users. The multiple levels of analysis and correlation from the individual level through the group, company, industry, and overall population provide opportunities to determine productive resources and usage practices. In an ASP model, with the user's and organization's permission, the gateway page provides a mechanism for targeted purchase offers, individualized advertisements, or marketing surveys, for example. In this model, the ASP acts as a broker between the user or organization and providers of goods and services. It should be appreciated that the technology described herein is not limited to ASP business models, but is amenable to other business models as well.

Moreover, reports such as the report 172 enable administrators to build user profiles that may be used for advertising purposes, to detect economic espionage, or to determine if the particular user posses a homeland security threat. Additionally, reports enable administrators or supervisors to understand trends in a user's behavior to understand how a user's behavior has changed over time. In one implementation, the reports are also available to each user so that each user can gain understanding into his or her behavior and take corrective action, if necessary.

The report 174 compares the utilization of two applications in a resource evaluation by displaying the number of users per day along a time line. By way of example, applications 1 and 2 may represent competing word processing applications. Reports, such as report 174, may be further utilized to determine if system applications have been upgraded. Additionally, the reports may be employed to determine the presence of exposures in software licensing compliance or determine the proper amount of licensing required.

Figure 5:
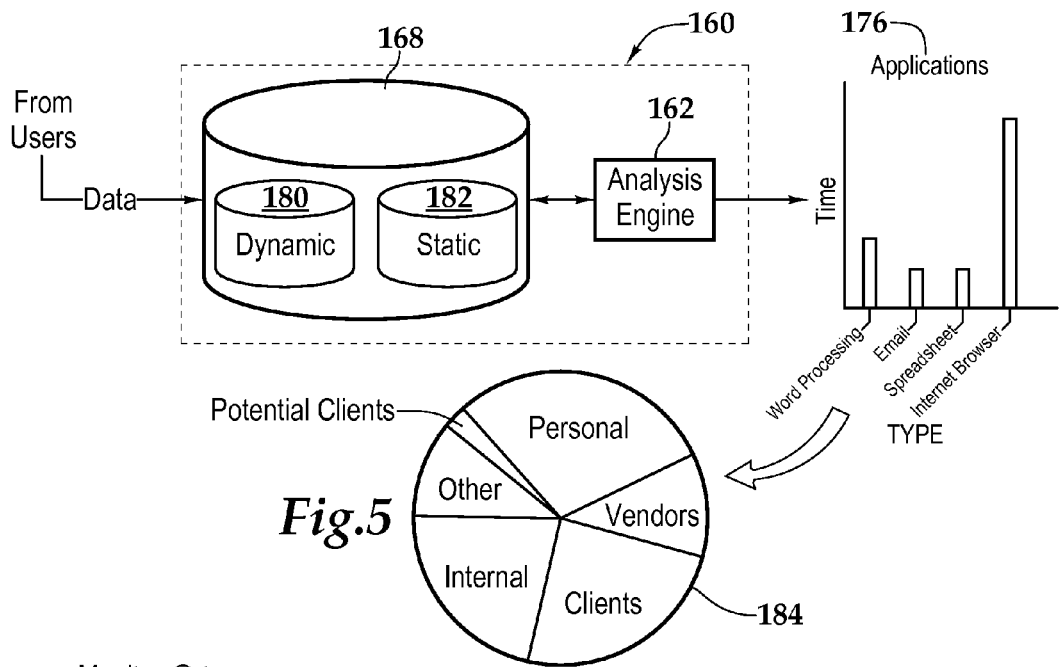
FIG. 5 is a further schematic diagram of the processing module generating reports in accordance with the teachings presented herein.

FIG. 5 depicts a further schematic diagram of the processing module 160 generating reports in accordance with the teachings presented herein. As shown, the database 168 may include dynamic storage 180 and static storage 182. In one embodiment, the dynamic and static storage may be use various accesses classes or be defined by "value-based" relationships where typically the relationship is specified at retrieval time and the locations of related records are discovered during retrieval. Data from users is constantly supplied to the dynamic storage 180 which is periodically copied to the static storage 182. The analysis engine 162 then generates reports, such as report 176, from the data in static storage 182. The frequency of transfer from the dynamic storage 180 to the static storage 182 will determine the lag between the reports and realtime conditions. Further, if reports regarding realtime management of resources are desired, the transfer frequency may be shortened. As illustrated, the reporting functionality, which will be discussed in further detail below, enables administration to drill down from one type of report to another. By way of example, an administrator viewing report 176 can drill down into the email category by way of report 184, which illustrates in a pie chart the various email senders/recipients. Once analyzed, the report may be utilized to encourage a behavior, discourage an activity, or a combination thereof. For example, the management of the user may desire to increase the number of emails corresponding with potential clients and establish the visual indicator to encourage such behavior. Further, the management of the user may desire to decrease the number of personal emails and establish the visual indicator to discourage such behavior.

More specifically, with respect to the operation of the processing module 160, as the data, which may be referred to as raw data, is collected by the monitoring module, the raw data is transferred to the processing module in substantially real-time and/or in periodic batches. Exemplary types of raw data are presented in Table I, below. At the processing module, the collected raw data is continuously or periodically processed and transformed into aggregate data which is stored and accessible in summary tables. In one implementation, the processing module pre-generates commonly requested reports using the aggregate data stored in the summary tables.

An administrator employing the systems and methods presented herein in the form of a productivity software suite interfaces with the processing module, which may be a reporting center engine, and selects from a menu of reports or selects a set of parameters to build a customizable report. If the former option is elected, then the processing module forwards the requested report to the productivity software suite for the administrator to view. The administrator may then drill down to other reports for additional information. For example, if a Top Websites Report by Group was selected to view the top websites visited by a group of employees, the administrator or manager may drill down to view a report on Top Websites Report for an Individual. In response to the administrator or manager requesting to drill-down into the Report, the processing module utilizes the summary table and aggregate data, which forms a portion of the basis of the originally requested report, to generate the newly requested report in substantially realtime. Further, it should be appreciated that the aggregate data structure provided by the processing modules permits the administrator to pull back on the reports and view a report at a higher level using the same technology and methodology that permits drilling down. Accordingly, the processing module uses the summary tables to dynamically provide scalable reports having varying levels of detail.

In the instances where the administrator selects a set of criteria to create a customized report, the processing module utilizes links between the selected criteria and particular parts of the aggregate data populating the summary tables to generate in the requested customized report. With this configuration and methodology, customized reports are built quickly, as it is not necessary to mine the raw data to construct the reports. Rather, the summary tables provide the foundation for creating the reports. It should be appreciated that the following table is non-exhaustive and non-limiting of the types of data.

TABLE 3

Types of Raw Data Collected

| Type | Definition |
| --- | --- |
| Activation period | Start and stop times and active period for each program used |
| Websites | Names and IP addresses of websites visited, time of day, duration, reports to whom in management |
| Operating Systems | Windows 2000, XP, Vista, Linux, Mac, etc |
| Service Pack | Latest version of OS patches |
| Employee Department | Sort employees by department |
| RAM | Size and type of Memory per computer |
| Hard Drive | Size, type, speed, capacity, unused, etc |
| Machine name | Name of machine and manufacturer |
| Subnet | Subnet assigned |
| User Login | Current, and previous logins to this machine with dates and times |
| IP Address | Current and previous IP addresses assigned with dates and times |

TABLE 3-continued

Types of Raw Data Collected

| Type | Definition |
| --- | --- |
| Printers, accessories | Lists printers assigned to machine and any accessories attached including dates of each |
| Application hanging | Reports on applications hanging for proactive management activities |
| All software applications | Reports per machine, department, enterprise . . . quantities, total time spent, average time spent, concurrent usage, per day, week, month, etc. |
| Detailed software information | Name, version, manufacturer, service pack, date installed, date last used, number of times used per day, week, month, etc, number of concurrent users per day, week, month, etc. number of average users per day week month etc., maximum number of users per day, week, month, etc. |
| Various Logging reports | Event logs, error logs, system logs, audit logs, etc., per day, week, month, etc. |
| Software Categorization | Software may be categorized by type for various needs . . . ie security software, business application software, internet, email, IM, etc. |
| Last login | Records last login to machine, name, date, attempts, etc. |
| Failed login | Reports attempts to hack into a machine |
| Antivirus | Categories and updates |
| Anti-spyware | Categories and updates |
| Management Capabilities | Separate users by department, specific management groups, managers, direct reports, and ability to provide logins at all levels to view lower level user activities in a management group, and restrict logins to only those a manager has responsibility over. |
| Exception based reporting | Ability to set various parameters and obtain reports based on violation of parameters |
| Bandwidth | Report on bandwidth consumption by application, user, machine, time of day, and cumulative reports by different groups or the entire organization. |
| Permissions | Permissions to view reports based on need and management level. IE, Security Reports, Software utilization, Productivity Reports |
| Stealth or Interactive | Runs silently tied to machine and login or interactively creating user awareness (displayable timer/meter/indicator) |
| Active Directory Compatible | Utilizes Active Directory for deployment and following of user movement changes |
| Immediate Manager level configuration changes | Managers or Administrators depending on permissions, may change rules, parameters, request reports, etc. |
| Profiling adaptability | For national security purposes, it would be possible to produce a profiling behavior report based on different types of computer behavior patterns and websites visited. |

Figure 6:
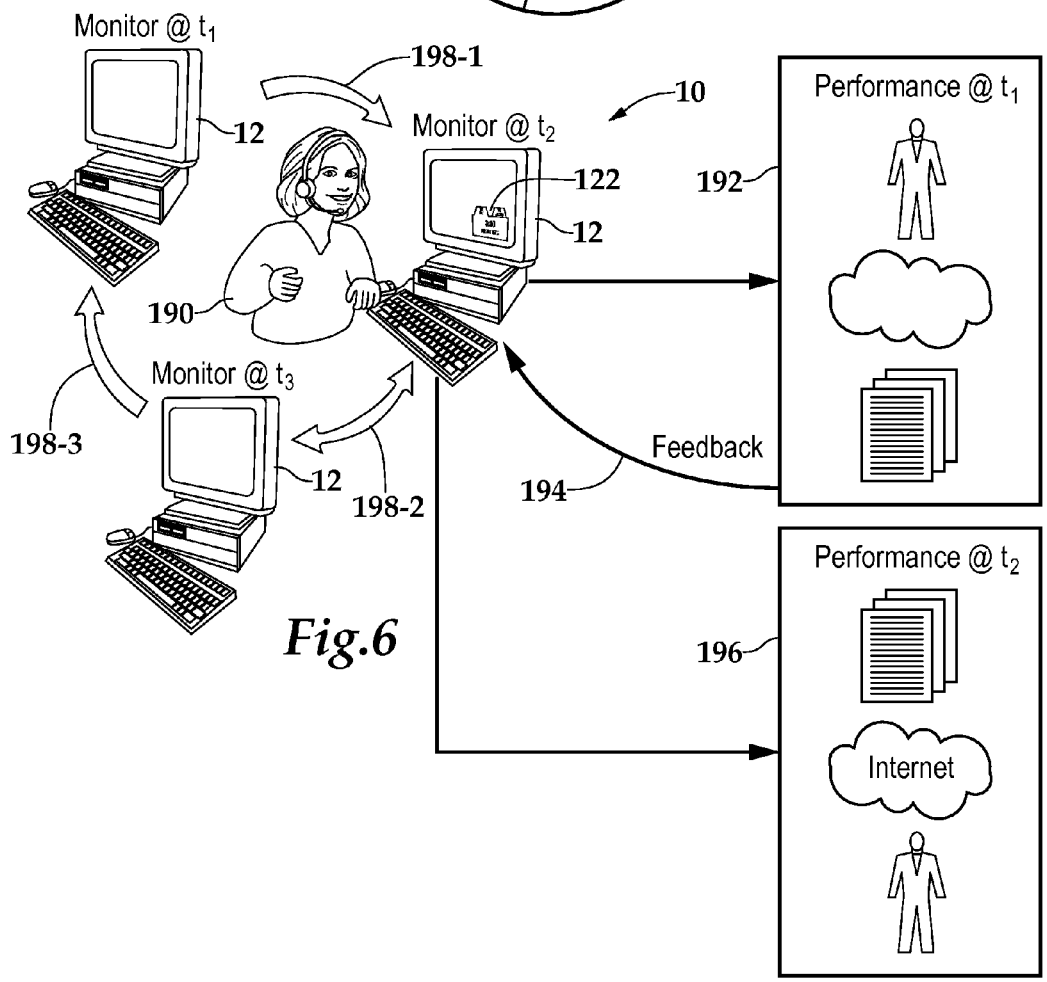
FIG. 6 is a schematic diagram of a user utilizing a computer having one embodiment of a system for monitoring application utilization installed thereon.

FIG. 6 depicts the system 10 for user self-directed behavioral management in a computing environment. A user 190, an employee of a company, utilizes the computer 12 to perform various tasks. At time $t_1$, the system is operating in a stealth mode and the performance of user 190 is schematically illustrated in report 192, unknown to the user 190, which was composed after analyzing various utilization parametrics associated with the behavior of user 190 and the management of various computing resources by the user 190. The report 192 indicates how the user 190 is spending her time in terms of a ranking and placement of icons that indicate the user 190 is spending the most time on IM applications followed by Internet applications and, lastly, word processing applications.

The report 192 therefore defines a baseline profile of the management of the computing resources by the user 190. As the system transitions from a stealth mode of operation to a transparent mode of operation from $t_1$ to $t_2$, as shown by arrow 198-1, the report 192 is shared with the user 190 to provide the user 190 with feedback 194 regarding her application utilization and management of computing resources. The feedback 194, which is the result of analysis of the utilization parametrics, provides the user 190 with a documented review and visibility into the behavior of the user 190. Also, at time $t_2$, to provide a tool to the user 190, the visual indicator 122 is visible to the user 190. The visual indicator 122 is depicted as a meter providing information relative to the management of the three computing components of the computing resources shown in the report 192; namely, management of IM applications, Internet applications, and word processing applications.

Based upon feedback 194 and the visual indicator 122, the user 190 corrects her behavior through self-directed behavior management as illustrated by a report 196 which iconically depicts the behavior of the user 190 at the later time, $t_2$. As depicted in the report 196, word processing applications receive the most attention from the user and IM applications receive the least time. Following a period of time, the system may advance to time $t_3$ where the user 190 may be presented with option of turning the visual indicator 122 ON and OFF. This may effectively transition the system between times $t_2$ and $t_3$ as shown by the double-headed arrow 198-2. Management and administrators may continue to run reports, such as reports 192 and 196, until such time the system returns to time $t_1$, as shown by arrow 198-3, due to the successful self-directed behavioral modification. Further, the amount of self-directed behavioral modification may be measured by comparing the reports 192 and 196.

Figure 7:
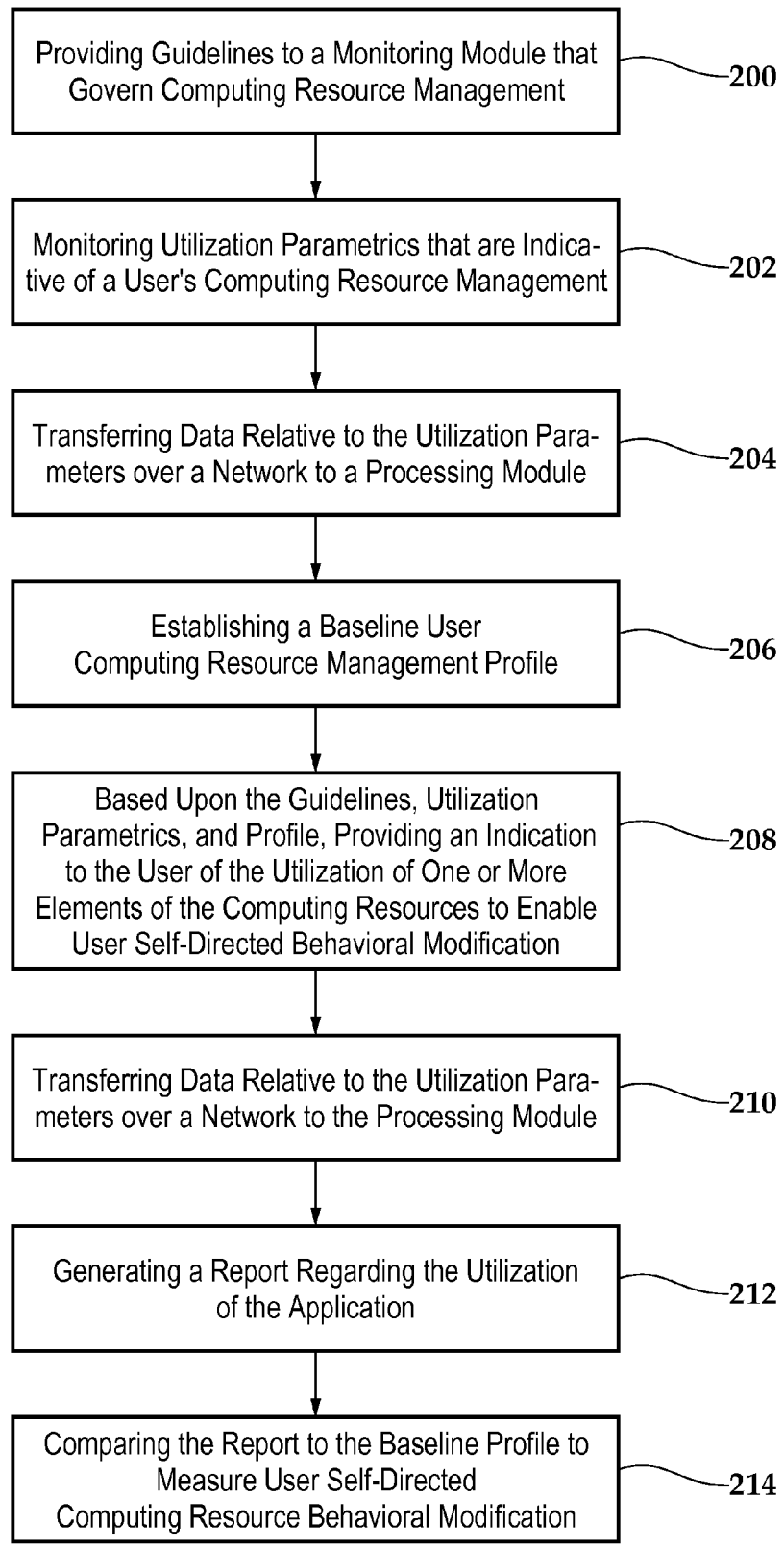
FIG. 7 is a flow chart of one embodiment of a method for monitoring application utilization.

FIG. 7 depicts a flow chart of one embodiment of a method for monitoring application utilization. At block 200, guidelines are provided to a monitoring module in order to govern computing resource management including the utilization of the application. At block 202, utilization parametrics are monitored to determine if and how the user is managing computing resources. At block 204, data relative to the utilization parametrics is transferred over a network to a processing module. At block 206, based upon the guidelines and the utilization parametrics, a baseline user computing resource management profile is established. At block 208, based upon the guidelines, utilization parametrics, and resource management profile, an indication is provided to the user that notifies the user of the utilization of one or more elements of the computing resources. In one embodiment, this visual indicator provides the feedback to enable user self-directed behavioral modification.

At block 210, monitoring the utilization parametrics that are indicative of a user's computing resource management continues. Additionally, the data relative to the utilization parametrics is transferred over the network, which, as discussed, may be an intranet or the Internet, to the processing module. At block 212, the processing module generates a report regarding the computing resource management. Such a report may include information regarding the utilization of a single application. The reports provide accurate and timely information regarding the IT infrastructure. At block 214, the report is compared to the baseline profile to measure the amount of user self-directed computing resource behavioral management. In particular, by use of the visual indicator and reporting, IT professionals are able to encourage the use of some computing resources while discouraging the user of other computing resources using self-directed behavioral management.

Figure 8:
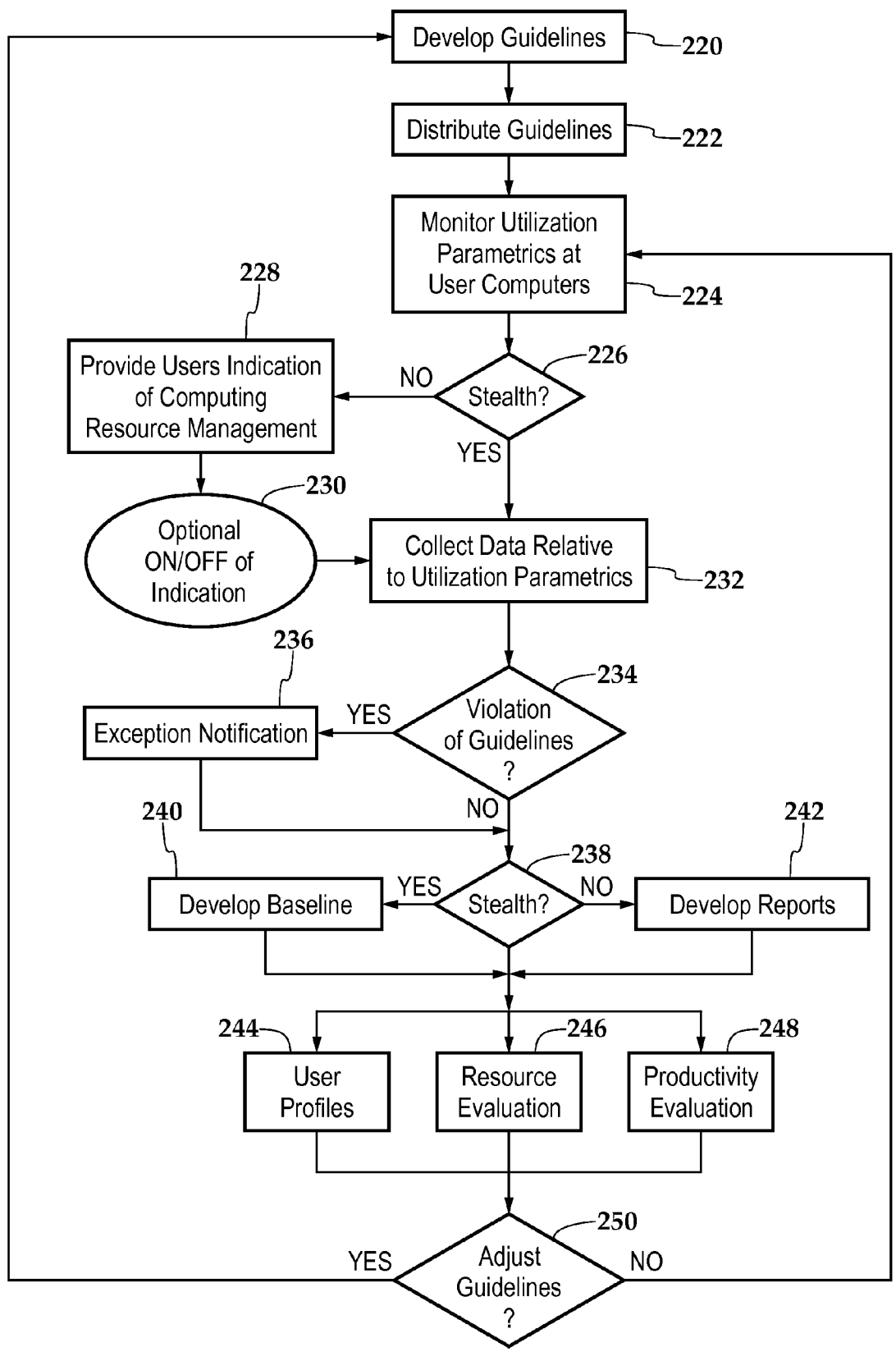
FIG. 8 is a flow chart of one embodiment of a method for monitoring application utilization.

FIG. 8 depicts a flow chart of another embodiment of a method for monitoring application utilization. At block 220, guidelines are developed. The guidelines may differ from user to user or be uniform. At block 222, the guidelines are distributed to user computers. At block 224, utilization parametrics are monitored at the user computers in accordance with the guidelines.

As previously discussed, the system and methods presented herein may operate in a transparent mode or a stealth mode which establishes a baseline of utilization of the computing resources by one or more users. In the transparent mode, the user is aware of the monitoring module and the guidelines in place. On the other hand, in the stealth mode, the user is unaware of the monitoring module or the guidelines. In one implementation, the stealth mode is used initially to establish the baseline prior to the use of the transparent mode which enables self-directed behavioral modification. At decision block 226, if the monitoring modules are operating in a transparent mode, then the methodology advances to block 228 and then to block 230. At block 228, the user is provided an indication of the application utilization. At block 230, in the transparent mode, after a period of self-directed behavioral modification with the aid of the visual indicator tool, the visual indicator may be turned ON and OFF by the user. This feature may be auto-enabled, enabled by an administrator, or include performance-based enablement. As an alternative, the visual indicator may be turned ON and OFF by the administrator.

At block 232, data is collected relative to the utilization parametrics. At decision block 234, if the guidelines are being violated, then the user is notified at block 236 before the methodology advances to block 238. The user notification may be in the form of a warning or verification that ensures the user is intent on following through with the violating behavior. In one embodiment, regardless of whether or not the user violates the guidelines, the monitoring module does not block the user's request. In this respect, the systems and methods presented herein do not act as filter. Rather, the systems and methods presented herein rely on the indications provided to the user by the meters and reports generated to create accountability. Moreover, in one implementation, when stealth mode is operational, no exception notification is given and regardless of a violation of guidelines, the methodology advances to block 238. At this block, if the methodology is operating in stealth mode, then a baseline report is developed at block 240. Otherwise a standard report is developed at block 242. The standard report may be identical to the baseline report and/or the standard report may include a comparison to the baseline report to measure user self-directed behavioral management.

At blocks 244 through 248, reports are developed such as reports regarding user profiles (block 244), resource evaluation (block 246), and productivity evaluation (block 248). These reports may be made available to management or administrators of the system and, in some implementations, when the methodology is operating in a transparent mode, the reports may be made available to individual users. At block 250, based upon the reports generated, the guidelines of one or more users may be adjusted as indicated by the return arrow to block 220. If no guidelines need to be adjusted, then the methodology returns to block 224.

It should be understood that the present invention is not limited to high level IT reports. The technology presented herein is portable and has applications in management reporting, organizational behavior, department behavior, human behavior, security, profiling, and other areas which require understanding and behavior modification.

The present invention in a monitoring module embodiment may provide visibility into application utilization to a user as well as the administrators. In one embodiment, the monitoring module may provide an indication to the user of the utilization of the application. The indication may take the form of a meter on the desktop that displays the amount of time consumed or time remaining. Accordingly, in this embodiment, the monitoring module provides the user visibility into the application utilization. In another embodiment, the monitoring module may provide a substantially realtime, visible indication to the user of the utilization of the application. It should be appreciated that the visible indication may relate to any of the aforementioned metrics related to the reporting aspects discussed herein.

With respect to the stealth and transparent modes of operation illustrated in blocks 226 and 238, as discussed, in one implementation, the methodology is first utilized in the stealth mode to determine the baseline behavior of group of users with respect to one or more applications. In the stealth mode of operation, the users are unaware of the monitoring agent. After developing a baseline profile of the application utilization, the methodology is utilized in the transparent mode to provide users feedback regarding their application utilization and to determine how users change their application utilization when they know that they are being monitored and being held accountable for their behavior. In this manner, user self-directed behavioral management is provided by way of the visual indicator.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A method for user self-directed management of computing resources in a computing environment, the method comprising:
providing a stealth mode wherein a user is unaware of a monitoring module and a transparent mode wherein the user is aware of the monitoring module;
in the stealth mode, providing guidelines to the monitoring module installed on a first computer, the guidelines governing computing resource management by the user of the first computer having the computing resources;
in the stealth mode, monitoring utilization parametrics that are indicative of the computing resource management by the user;
in the stealth mode, transferring data relative to the utilization parametrics over a network from the monitoring module to a processing module installed on a second computer;
based upon the data, generating a baseline user computing resource management profile at the processing module;
based upon the guidelines, the utilization parametrics, and the profile, providing a visual indicator in the transparent mode on the first computer for the user, the visual indicator indicating utilization of a computing element of the computing resources;

in the transparent mode, after providing the visual indicator and continuing to monitor the utilization parametrics, providing an option to the user to turn the visual indicator ON and OFF;

in the transparent mode, after providing the visual indicator, continuing to monitor the utilization parametrics that are indicative of the computing resource management by the user;

in the transparent mode, transferring additional data relative to the utilization parametrics over the network from the monitoring module to the processing module;

based upon the additional data, generating a user computing resource management report at the processing module; and comparing the user computing resource management report to the baseline user computing resource management profile such that an administrator of the network that is an individual other than the user measures user self-directed computing resource behavioral management.

2. The method as recited in claim 1, wherein providing the visual indicator further comprises providing a substantially realtime, visible indication to the user of utilization of the computing element of the computing resources.

3. The method as recited in claim 1, wherein providing the visual indicator further comprises providing a visible indication to the user of the amount of authorized time relative to utilization of the computing element of the computing resources.

4. The method as recited in claim 1, wherein providing the visual indicator further comprises providing a visible indication to the user of the amount of authorized time relative to utilization of the Internet.

5. The method as recited in claim 1, wherein prior to first transferring data relative to the utilization parametrics, operating the monitoring module in a stealth mode.

6. The method as recited in claim 1, wherein after providing the visual indicator, operating the monitoring module in a transparent mode.

7. The method as recited in claim 1, further comprising scaling the monitoring module to a plurality of monitoring modules for a respective plurality of users and computers.

8. The method as recited in claim 1, further comprising providing the baseline user computing resource management profile to a manager of the user.

9. The method as recited in claim 1, further comprising providing the user computing resource management report to a manager of the user.

10. The method as recited in claim 1, wherein the providing a visual indicator is after the generating a profile.

11. The method as recited in claim 1, further comprising based upon the report generated, adjusting the guidelines.

* * * * *